(12) United States Patent
Lee et al.

(10) Patent No.: US 9,255,730 B2
(45) Date of Patent: Feb. 9, 2016

(54) REFRIGERATOR

(71) Applicant: LG ELECTRONICS INC., Seoul (KR)

(72) Inventors: Jihyun Lee, Seoul (KR); Woonkyu Seo, Seoul (KR); Daesung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 14/191,940

(22) Filed: Feb. 27, 2014

(65) Prior Publication Data

US 2014/0300265 A1  Oct. 9, 2014

(30) Foreign Application Priority Data

Apr. 8, 2013 (KR) ........................ 10-2013-0038227

(51) Int. Cl.
*F25D 29/00* (2006.01)

(52) U.S. Cl.
CPC .......... *F25D 29/00* (2013.01); *F25D 2400/361* (2013.01); *F25D 2500/06* (2013.01); *F25D 2700/06* (2013.01); *F25D 2700/08* (2013.01)

(58) Field of Classification Search
CPC ............................. F25D 23/025; F25D 23/062
USPC .................................. 312/401, 402, 404, 405
See application file for complete search history.

(56) References Cited

U.S. PATENT DOCUMENTS

| 7,836,709 | B2* | 11/2010 | An et al. ........................ 62/126 |
| 2006/0096303 | A1* | 5/2006 | Kavounas ....................... 62/125 |
| 2008/0315739 | A1* | 12/2008 | Hirano ........................ 312/330.1 |
| 2010/0170289 | A1* | 7/2010 | Graziano ......................... 62/449 |
| 2010/0283573 | A1* | 11/2010 | Yum et al. ....................... 340/3.1 |
| 2013/0015753 | A1 | 1/2013 | Son et al. ....................... 312/405 |
| 2014/0137587 | A1* | 5/2014 | Hitzelberger ................. 62/228.1 |

FOREIGN PATENT DOCUMENTS

| JP | 2002-267337 A | 9/2002 |
| JP | 2004-183987 A | 7/2004 |

OTHER PUBLICATIONS

European Search Report dated Jul. 22, 2014 issued in Application No. 14 153 950.2.

* cited by examiner

*Primary Examiner* — Matthew Ing

(74) *Attorney, Agent, or Firm* — Ked & Associates, LLP

(57) ABSTRACT

A refrigerator is provided. The refrigerator may include a main body having a first storage compartment and a second storage compartment, a first door rotatably coupled to the main body to open and close the first storage compartment, a second door slidably coupled to the main body to open and close the second storage compartment, a receptacle received in the second storage compartment and coupled to the second door to move together with the second door, and a camera installed at the main body to take a picture of an interior of the receptacle. A controller may combine a plurality of pictures taken by the camera as the second door is moved, and may correct the images into an image showing the interior of the receptacle.

16 Claims, 18 Drawing Sheets

REFRIGERATOR

CROSS-REFERENCE TO RELATED APPLICATION(S)

This application claims priority under 35 U.S.C. §119 to Korean Application No. 10-2013-0038227 filed in Korea on Apr. 8, 2013, whose entire disclosure is hereby incorporated by reference.

BACKGROUND

1. Field

This relates to a refrigerator, and more particularly to a refrigerator which may provide information related to items stored therein.

2. Background

A refrigerator may supply cold air generated via driving of a refrigeration cycle to store items in a low temperature state. Refrigerators may provide other functions, in addition to the simple function of storing items in a low temperature state.

For example, a refrigerator may receive and store items in a storage chamber closed by a door, which requires that the door be opened to check the contents of the refrigerator.

BRIEF DESCRIPTION OF THE DRAWINGS

The embodiments will be described in detail with reference to the following drawings in which like reference numerals refer to like elements wherein.

DETAILED DESCRIPTION

Figure 1:
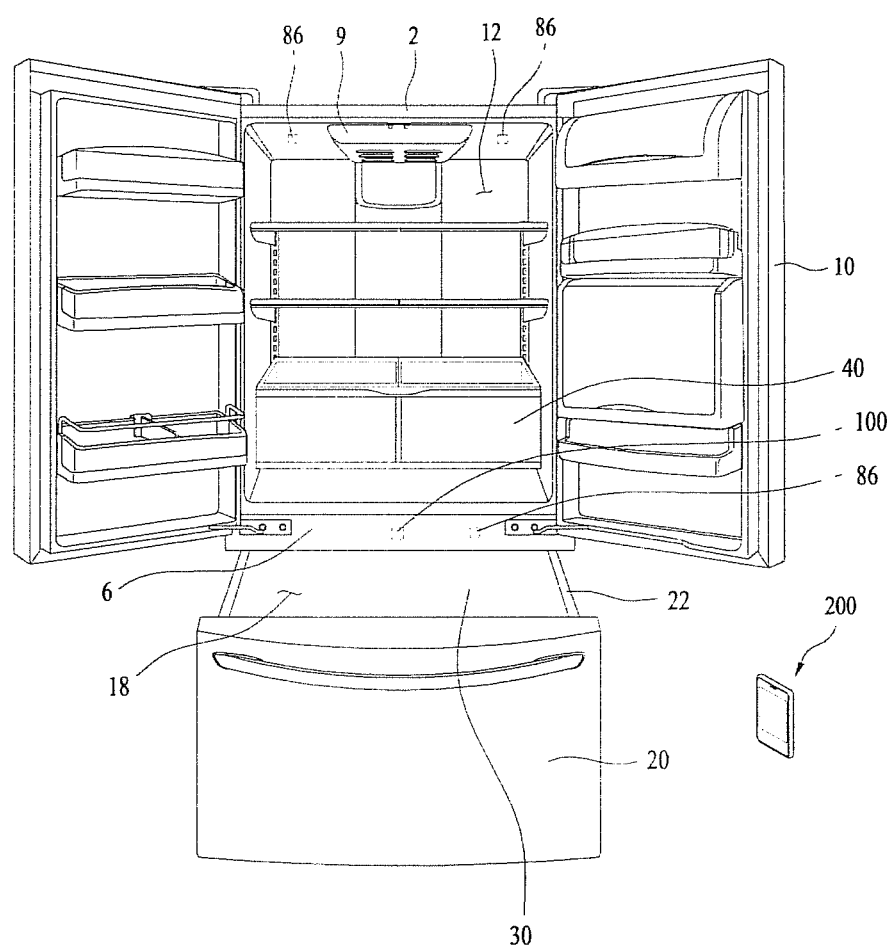
FIG. 1 is a front view of a refrigerator according to one embodiment as broadly described herein.

Hereinafter, exemplary embodiments will be described with reference to the accompanying drawings. In the drawings, the shape, size, or the like of components may be exaggerated for clarity and convenience. In addition, the terms particularly defined in consideration of various configurations and operations may be replaced by other terms based on intentions of those skilled in the art or customs. The meanings of these terms may be construed based on the overall content of this specification.

A refrigerator according to one embodiment as broadly described herein may include a main body 2 providing a first storage compartment 12 and a second storage compartment 18 forming cold air receiving spaces therein, a first door 10 configured to open the first storage compartment 12, and a second door 20 configured to open the second storage compartment 18.

The first door 10 may open the first storage compartment 12 via pivotal rotation thereof. A plurality of first doors 10 may be provided, such that the first doors 10 may be arranged respectively at two opposite sides of the first storage compartment 12 so as to be pivotally rotated in opposite directions. In this case, the first doors 10 may be connected to the main body 2 via hinges.

The second door 20 may be moved forward of the second storage compartment 18 to open the second storage compartment 18. In this case, rails 22 may be provided at both sides of the second door 20 to guide movement of the second door 20. As such, the second door 20 may slide forward or rearward out of and into the second storage compartment 18.

A cold air duct 9 is provided in the first storage compartment 12 to supply cold from through an evaporator into the first storage compartment 12. In detail, a portion of cold air that has passed through the evaporator may be supplied into the first storage compartment 12 through the cold air duct 9.

In addition, a plurality of shelves 14, on which on which storage items may be received, may be provided in the first storage compartment 12. A variety of items may be received on the plurality of shelves 14. The plurality of shelves 14 may be installed at different heights, and some of the plurality of shelves 14 may define an open space therebelow.

A drawer 40 may be provided in the space defined below the shelf 14. In this case, the drawer 40 may allow items to be stored in the lower space defined below the shelf 14 and may be introduced into or withdrawn from the lower space.

Alternatively, a plurality of drawers 40 may be provided to divide the lower space defined by the shelf 14 into a plurality of spaces that may be individually used.

One or more light source 86 may be installed in the first storage compartment 12 to emit light into the first storage compartment 12 when a user opens the first door 10.

The first storage compartment 12 and the second storage compartment 18 may provide storage spaces having different interior temperatures. In particular, one of the first storage compartment 12 or the second storage compartment 18 may be a refrigerating compartment, the other may be a freezing compartment.

A barrier 6 may be provided in the main body 2 to structurally separate the first storage compartment 12 and the second storage compartment 18 from each other. In this case, the barrier 6 may extend horizontally such that the first storage compartment 12 is defined above the barrier 6 and the second storage compartment 18 is defined below the barrier 6. In addition, the barrier 6 may have a prescribed thickness to maintain a temperature difference between the first storage compartment 12 and the second storage compartment 18.

According to one embodiment, a receptacle 30, in which items may be stored, is mounted to one side of the second door 20. The receptacle 30 may be moved along with the second door 20 and received in the second storage compartment 18. The receptacle 30 may take the form of a basket having an open top, and thus the user may access the receptacle 30 after withdrawing the second door 20 out of the second storage compartment 18.

A camera 100 may be installed in the second storage compartment 18. For example, the camera 100 may be mounted on the main body 2, i.e. the barrier 6.

The camera 100 may be oriented downward to capture an image looking down into the receptacle 30.

One or more light sources 86 may be installed in the second storage compartment 18 to emit light into the second storage compartment 18. For example, the light source 86 may emit light into the receptacle 30 when the user opens the second storage compartment 18, i.e. when the second door 20 is withdrawn.

Alternatively, the light source 86 may emit light to a picture taking range of the camera 100 when the camera 100 takes a picture.

In certain embodiments, the first door 10 may include a display 120. The display 120 may provide the user with various information including, e.g. food stored in the refrigerator, and transmit information input by the user to other devices. The display 120 may have various forms so long as it displays prescribed information and enables touch input of a prescribed instruction. In one example, the display 120 may be a touchscreen that provides for both input and display. The display 120 may be separably coupled to a front surface of the first door 10 so that the user may attach or detach the display 120 to or from the refrigerator as needed. Alternatively, the display 120 may be detachably coupled to the second door 20.

Prescribed information displayed on the display 120 may be transmitted to a terminal 200 that is connected to the refrigerator through a network. The terminal 200 may be, for example, a smart-phone that is not integrated with the refrigerator, but independent of the refrigerator to allow the user to carry the terminal 200 to a location that is remote from the refrigerator. Accordingly, the user having the terminal 200 may recognize information related to the interior of the refrigerator, more particularly information related to items stored in the receptacle 30 without physically accessing the refrigerator.

Figure 2:
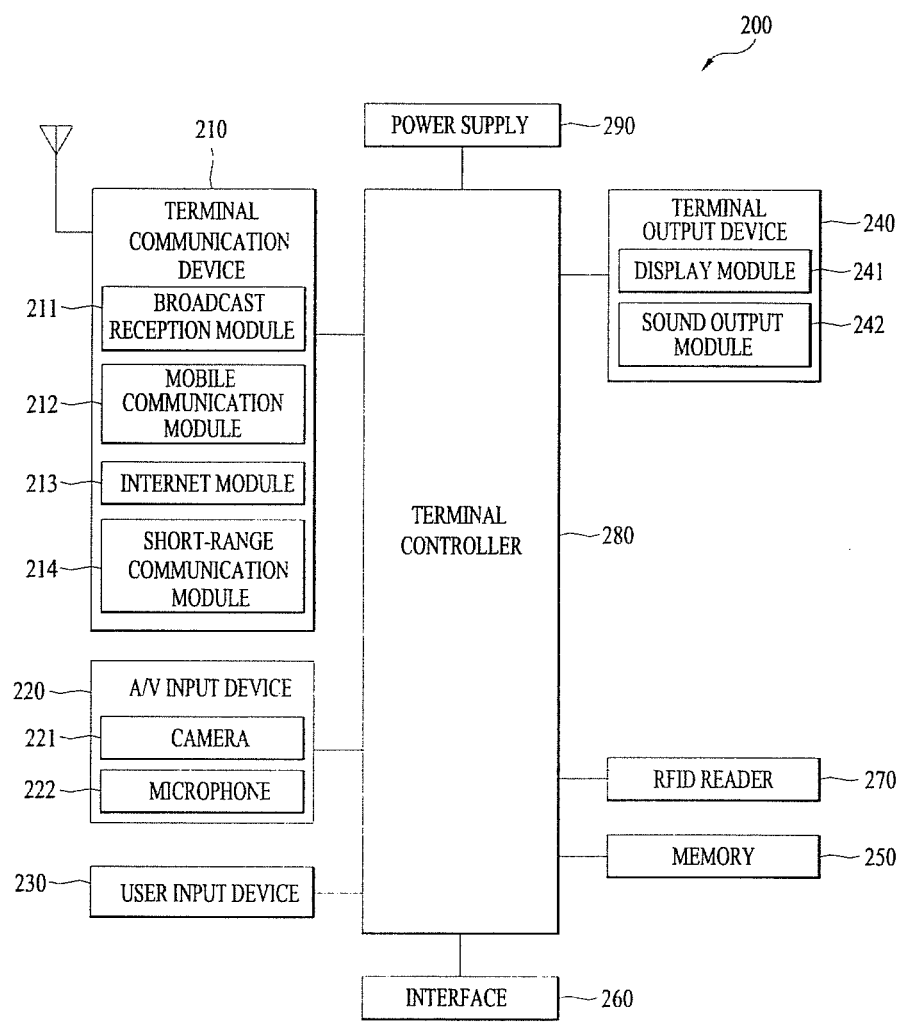
FIG. 2 is a block diagram of a terminal controller, according an embodiment as broadly described herein.

With reference to FIG. 2, the terminal 200 as embodied and broadly described herein may include a terminal communication device 210, an Audio/Video (A/V) input device 220, a user input device 230, a terminal output device 240, a memory 250, an interface device 260, a Radio Frequency Identification (RFID) reader 270, a terminal controller 280, and a power supply device 290, for example. Note that components shown in FIG. 2 are not essential, and the terminal 200 having a greater or fewer number of components may be employed.

Hereinafter, the aforementioned components will be described in order.

The terminal communication device 210 may include one or more modules to enable use of the Internet between the terminal 200 and a wireless communication system or in an Internet protocol network in which the terminal 200 is located. For example, the terminal communication device 210 may include a broadcast reception module 211, a mobile communication module 212, an Internet module 213, and a short-range communication module 214. The broadcast reception module 211 receives broadcast signals and/or broadcast information from an external broadcast management server through a broadcast channel under control of the terminal controller 280, and plays back the same on a display module 241 of the terminal output device 240.

The mobile communication module 212 implements transmission/reception of wireless signals with at least one of a base station, an external terminal, and a server through a mobile communication network. The wireless signals may include voice signals, video call signals, or various other data based on transmission/reception of text/multimedia messages. The Internet module 213 may provide for wired/wireless Internet connection. Wireless Internet technologies may include Wireless LAN (WLAN) (Wi-Fi), wireless broadband (WiBro), World Interoperability for Microwave Access (WiMAX), High Speed Downlink Packet Access (HSDPA), and the like. The short-range communication module 214 may provide for short-range communication. Short-range communication technologies may include Bluetooth, Radio Frequency Identification (RFID), Infrared Data Association (IrDA), Ultra Wideband (UWB), ZigBee, and the like.

The A/V input device 220 may receive audio and video input signals, and may include a camera module 221 and a microphone 222, for example. The camera module 221 processes image information including, e.g. a still image or a moving image captured by an image sensor in a video call mode or an image capture mode. The processed image information may be displayed on the display module 241. Image data processed in the camera module 221 may be stored in the memory 250, or may be transmitted to, e.g., an external terminal through the terminal communication device 210. Two or more camera modules 221 may be provided depending on particular use environments. The microphone 222 receives an external sound signal, e.g., in a call mode, a recording mode or a voice recognition mode, and processes the same into electrical voice data.

The user input device 230 generates input data to allow the user to control operation of the terminal 200. The user input device 230 may include a keypad, a direction key, a dome switch, a touchpad (constant-pressure/capacitive), a jog wheel, a jog switch, and the like.

The terminal output device may generate visual or auditory output, and may include the display module 241 and a sound output module 242, for example. The display module 241 displays (outputs) information processed in the terminal 200. For example, when displaying information related to the terminal 200 and the refrigerator, the display module 241 of the terminal 200 may display the interior state of the refrigerator.

The display module 241 may include at least one of a Liquid Crystal Display (LCD), a Thin Film Transistor Liquid Crystal Display (TFT LCD), an Organic Light Emitting Diode (OLED), a flexible display, or a 3D display.

If the display module 241 and a sensor to sense a touch motion (hereinafter referred to as 'a touch sensor') are constructed in a layered structure (hereinafter referred to as 'a touchscreen'), the display module 241 may be used as an input device as well as an output device. The touch sensor may take the form of a touch film, a touch sheet, or a touch pad, for example. The touch sensor may be configured to convert, e.g., a pressure applied to a specific portion of the display module 241 or a variation of capacitance generated from the specific portion of the display module 241 into an electrical input signal. The touch sensor may be configured to detect a touch pressure applied to the display module 241 as well as a touched location and an area of the touched location. When a touch input is generated with respect to the touch sensor, the signal(s) corresponding to the touch input is transmitted to a touch controller which processes the signal(s), and transmits data corresponding to the signal(s) to the terminal controller 280. Thereby, the terminal controller 280 may recognize, e.g., whether any region of the display module 241 is touched.

The sound output module 242 outputs data containing audio stored in the memory 250, or outputs sound informing the user of an operational state of the refrigerator. The sound output module 242 may include a receiver, a speaker, or a buzzer, for example.

The memory 250 may store a program for processing and control of the terminal controller 280, and may contain information related to food stored in the refrigerator. In addition, the memory 250 stores graphic data to provide the user with various messages and information via various visual effects. The above-described memory 250 may include a storage medium having at least one type among a flash memory type, a hard disk type, a multimedia card micro type, a card type of a memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

The interface device 260 may connect various external devices to the refrigerator terminal 200. The interface device 260 may receive data or power from an external device, and transfer the data or power to each component in the terminal 200, or transmit internal data of the terminal 200 to an external device. For example, the interface device 260 may include a wired/wireless headset port, an external charger port, a wired/wireless data port, a memory card port, a port for connection of a device having an identification module, an audio Input/Output (I/O) port, a video I/O port, and an earphone port.

The terminal controller 280 may control overall operation of the terminal 200.

The power supply 290 receives power applied from an external power source through the interface device 260 and supplies the power to operate each component under control of the terminal controller 280.

Exemplary embodiments described herein may be implemented in a recording medium capable of being read by a computer or a similar device using, e.g., software, hardware, or a combination thereof.

According to hardware implementation, exemplary embodiments described herein may be realized using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions.

In some cases, exemplary embodiments may be implemented by the terminal controller 280.

According to software implementation, exemplary embodiments with regard to procedures and functions described herein may be realized by separate software modules. Each of the software modules may perform at least one function and operation.

Software code may be embodied as a software application that is written in an appropriate programming language. The software code may be stored in the memory 250, and may be executed by the terminal controller 280.

Figure 3:
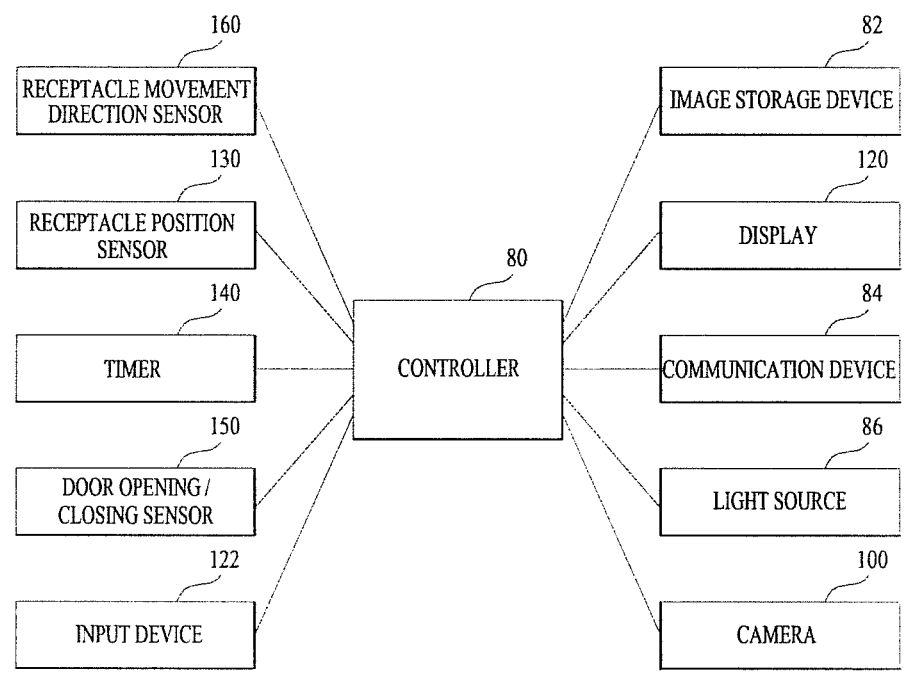
FIG. 3 is a block diagram of a controller, according to an embodiment as broadly described herein.

FIG. 3 is a control block diagram according to one embodiment as broadly described herein.

As shown in FIG. 2, a controller 80 may be provided to combine a plurality of pictures taken by the camera 100 with one another and correct the pictures into an image of the receptacle 30. For example, the controller 80 may correct a plurality of pictures taken by the camera 100 into a single image, and may transmit a single picture taken by the camera 100 to an external device, i.e. the terminal 200.

In particular, the controller 80 may combine an image captured by the camera 100 in a closed state of the door 20 and an image captured by the camera 100 in an open state of the door 20 with each other, and may correct the images into an image of the receptacle 30, and in particular, the contents of the receptacle 30.

In this case, the closed state of the door 20 may refer to a state in which the receptacle 30 is completely hermetically sealed, or a state in which the receptacle 30 is hermetically sealed to a designated level or more.

The image captured by the camera 100 in the closed state of the door 20 and the image captured by the camera 100 in the open state of the door 20 may capture different regions of the receptacle 30. Accordingly, if the receptacle 30 has a long length in a front-and-rear direction, plural images captured by the camera 100 may be combined with one another to acquire an image of the entire receptacle 30.

In this case, the open state of the door 20 may include a state in which the door 20 is open and is stationary. That is, the open state of the door 20 may indicate that the door 20, i.e. the receptacle 30 is stationary in a state in which the user has access to the interior of the receptacle 30. For example, the open state of the door 20 may correspond to a point in time immediately before the door 20, that has been withdrawn from the compartment 18 and moved forward to open the receptacle 30, is pushed rearward to close and seal the receptacle 30.

Moreover, the open state of the door 20 may include a state in which the door 20 is open and is moving. That is, the open state of the door 20 may mean that the door 20, i.e. the receptacle 30 is moving so that the user may access the receptacle 30. For example, the open state of the door 20 may correspond to a duration for which the door 20 is being withdrawn and moved forward to open the receptacle 30 or a duration for which the door 20 is being pushed rearward to close and seal the receptacle 30.

The open state of the door 20 may include a state in which the door 20 is open and is stationary, and a state in which the door 20 is open and is moving.

The controller 80 may combine two pictures taken by the camera 100 into a single image, or may combine three or more pictures into a single image.

The controller 80 may provide the user with an intuitively and easily recognizable image by combining the pictures taken by the camera 100. In this case, the controller 80 may implement combination of a plurality of pictures and individual correction of the pictures. Combination of a plurality of pictures may be implemented by an external control device rather than the controller 80 of the refrigerator.

According to one embodiment, a receptacle position sensor 130 may be provided to sense a position of the receptacle 30. The receptacle position sensor 130 may check whether the receptacle 30 has been moved as well as a moved position of the receptacle 30.

In addition, when the receptacle position sensor 130 senses that the receptacle 30 reaches a predetermined position, the receptacle position sensor 130 may transmit a related signal to the controller 80 to allow the controller 80 to instruct the camera 100 to take a picture. For example, a plurality of positions may be predetermined with regard to the receptacle 30 such that the camera 100 takes a plurality of pictures of the receptacle 30.

The receptacle position sensor 130 may include a Hall sensor using Hall effects. The Hall sensor may find the magnitude and direction of a magnetic field using Hall effects in which a potential difference is produced across a conductor carrying an electric current when a magnetic field is applied in a direction perpendicular to that of the current flow.

According to one embodiment, a timer 140 may be provided to measure passage of time. The timer 140 may measure, in particular, a movement duration of the receptacle 30, and may also measure general passage of time. When a predetermined time measured by the timer 140 has elapsed, the timer 140 may transmit a related signal to the controller 80 to allow the controller 80 to instruct the camera 100 to take a picture.

According to one embodiment, a door opening/closing sensor 150 may be provided to sense opening/closing of the second door 20. The door opening/closing sensor 150 may sense whether or not the second door 20 is released from contact with the main body 2, for example. The door opening/closing sensor 150 may transmit information related to whether the door 20 is open or closed to the controller 80.

According to one embodiment, a receptacle movement direction sensor 160 may be provided to sense a movement direction of the receptacle 30. The receptacle movement direction sensor 160 may include a plurality of receptacle position sensors 130 to sense a movement direction of the receptacle 30 using sensed results from the receptacle position sensors 130.

The receptacle movement direction sensor 160 may sense a movement direction of the receptacle 30 and transmit a related signal to the controller 80. That is, the controller 80 may detect a movement direction of the receptacle 30 with the assistance of the receptacle movement direction sensor 160. More specifically, since the receptacle 30 may be withdrawn from the second storage compartment 18 or be introduced into the second storage compartment 18, the receptacle movement direction sensor 160 may sense whether the receptacle 30 is moving forward or rearward.

According to one embodiment, an image storage unit 82 may be provided to store an image corrected by the control unit 80. The image storage device 82 may store all images corrected by the controller 80 including the most recently corrected image as well as previously corrected images. The images stored in the image storage device 82 may be transmitted to the terminal 200 or the display 120, and the user may recognize information related to the interior of the refrigerator via the terminal 200 or the display 120.

According to one embodiment, an input device 122 may be provided to allow the user to input an instruction to the refrigerator. The input device 122 may be integrated with the display 120 to allow the user to input an instruction via the display 120.

The input device 122 may receive a general instruction with regard to control of the refrigerator, and may also receive an instruction with regard to control of the camera 100.

According to one embodiment, a communication device 84 may be provided to transmit an image corrected by the controller 80 to an external device. The communication device 84 may transmit a corrected image to the terminal communication device 210 as exemplarily shown in FIG. 2. In particular, the communication device 84 may transmit an image stored in the image storage device 82 or an image corrected by the controller 80 to an external device.

The controller 80 may control the light source 86 so that the light source 86 emits light to the receptacle 30 when the camera 100 takes a picture.

Figure 4:
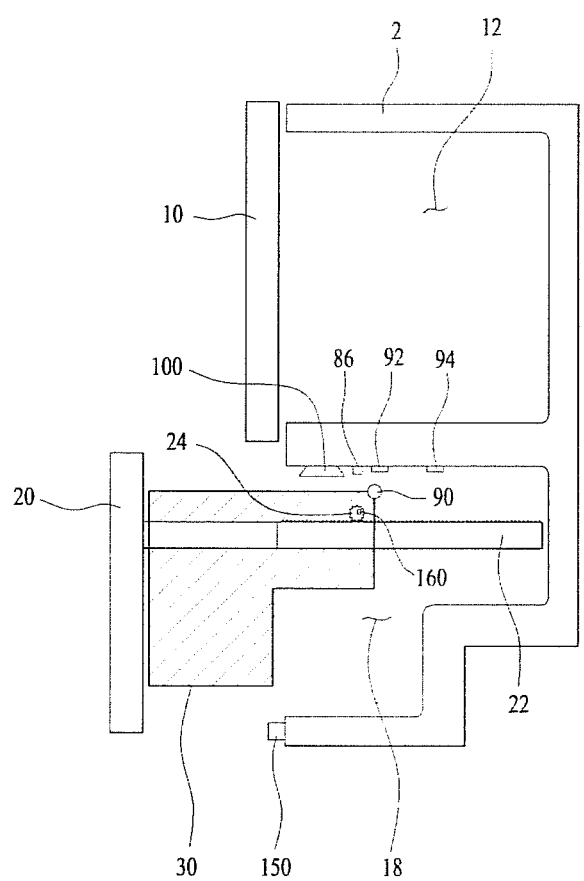
FIGS. 4 to 6 are side sectional views of operation of the refrigerator shown in FIG. 1, according to an embodiment as broadly described herein.

FIG. 4 is a slight sectional view illustrating operation of the refrigerator, according to one embodiment as broadly described herein.

The camera 100 may be installed in a front region of the storage compartment. In this case 18, for example, proximate to a position where the door 20 is located. In particular, the camera 100 may be installed so that it is able to take a picture of the receptacle 30 even at a maximum withdrawal region of the receptacle 30. That is, even in a section where the receptacle 30 is maximally withdrawn, a picture taken by the camera 100 may show the interior of the receptacle 30. In other words, the camera 100 may be located in a movement path of the receptacle 30 to ensure that an image captured by the camera 100 shows the full interior of the receptacle 30.

As the camera 100 is located in the front region of the storage compartment 18, the camera 100 may capture images of the receptacle 30 at various positions during movement of the receptacle 30. That is, the camera 100 is stationary, whereas the receptacle 30 is movable, which may allow the camera 100 to take pictures of various portions of the receptacle 30 as the receptacle 30 moves. In other words, even if a single camera does not have the viewing angle required to take a picture of the interior of the entire receptacle 30, acquisition of the picture of the interior of the entire receptacle 30 may be possible by taking multiple pictures as the receptacle moves.

The receptacle position sensor 130 may be installed at the ceiling of the second storage compartment 18, and may include a plurality of Hall sensors 92 and 94 installed at the barrier 6. In addition, the receptacle position sensor 130 may include a magnet 90 provided at one side of the receptacle 30. The magnet 90 has an effect on the plurality of Hall sensors 92 and 94 while being moved along with the receptacle 30, thereby assisting the Hall sensors 92 and 94 in determining a position of the receptacle 30. That is, if the magnet 90 has an effect on the respective Hall sensors 92 and 94, it may be understood that the receptacle 30 is moved to a position corresponding to the Hall sensors 92 and 94.

The magnet 90 may be located at one end of the receptacle 30, as shown in FIG. 4, or at various other positions on the receptacle 30 as appropriate. The plurality of Hall sensors 92 and 94 may be spaced apart from each other, thereby serving to sense a moved position of the receptacle 30. In certain embodiments, a greater number of Hall sensors than two Hall sensors 92 and 94 may be provided to enable more precise determination of a position of the receptacle 30. If the two Hall sensors 92 and 94 are provided, the Hall sensors 92 and 94 may be located at, for example, trisection positions to divide the second storage compartment 18 into three parts. If more Hall sensors are provided, the Hall sensors may be equidistantly spaced apart from one another along the length of the receptacle.

The camera 100 and the light source 86 may be installed at the barrier 6. In this case, the camera 100 may be located proximate to a position where the second door 20 and the barrier 6 meet each other when the door 20 is closed. That is, the camera 100 may be located closer to the second door 20 than the main body 2, and may remain stationary regardless of movement of the second door 20.

The light source 86 may be positioned into emit light to the receptacle 30. That is, the light source 86 may emit light downward.

The second door 20 and the receptacle 30 may be introduced into or withdrawn from the compartment 18 along the rails 22. The rails 22 may take the form of lines of plural screw threads, and the receptacle 30 may have a gear 24 that is movable along the screw threads. That is, when the second door 20 and the receptacle 30 are withdrawn from the second storage compartment 18, the gear 24 may be rotated counterclockwise. On the other hand, when the second door 20 and the receptacle 30 are introduced into the second storage compartment 18, the gear 24 may be rotated clockwise.

In this case, the receptacle movement direction sensor 160 may be provided at the gear 24. That is, the receptacle movement direction sensor 160 may sense a movement direction of the receptacle 30 according to a rotating direction of the gear 24.

More specifically, it may be determined that the user withdraws the receptacle 30 from the compartment 18 when the gear 24 is rotated counterclockwise, and introduces the receptacle 30 into the compartment 18 when the gear 24 is rotated clockwise. The receptacle movement direction sensor 160 may have various other shapes so long as it may sense a movement direction of the receptacle 30.

The door opening/closing sensor 150 to sense opening/closing of the second door 20 may be mounted at the main body 2. The door opening/closing sensor 150 may be mounted to the main body 2 at a position where the second door 20 closes the second storage compartment 18, and thus may be pressurized when the second door 20 comes into contact with the main body 2. On the other hand, the door opening/closing sensor 150 may be released when the second door 20 opens the second storage compartment 18, i.e. when the second door 20 is separated from the main body 2. That is, the door opening/closing sensor 150 may sense opening or closing of the second storage compartment 18 according to whether or not the door opening/closing sensor 150 is pressurized by the second door 20.

In certain embodiments, a plurality of cameras 100 may be provided. The plurality of cameras 100 may be arranged parallel to the second door 20. If the receptacle 30 has a relatively large width, the receptacle 30 may deviate from a picture taking range of the camera 100. Therefore, a plurality of cameras may be installed to eliminate blind area(s) of the receptacle 30.

Figure 5:
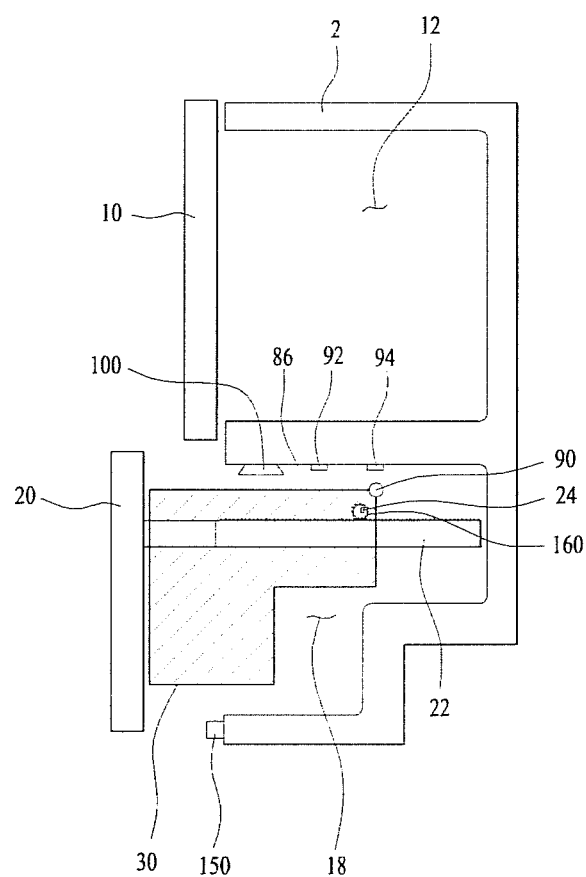
Figure 6:
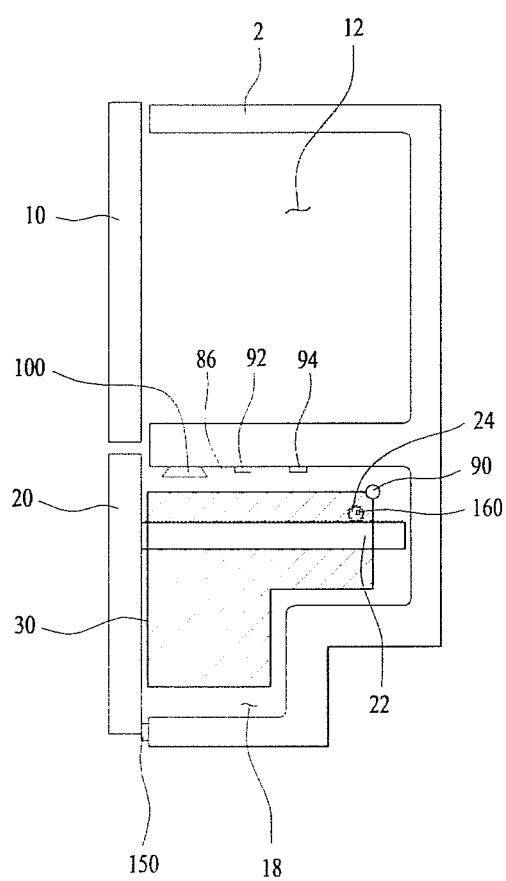

With reference to FIGS. 4 to 6, operation according to one embodiment will hereinafter be described.

The door opening/closing sensor 150 may sense whether the second door 20 opens or closes the second storage compartment 18. Thus, the door opening/closing sensor 150 may sense a moment when the second door 20, which has hermetically sealed the second storage compartment 18 begins to open. That is, this moment may be recognized as a moment when the door opening/closing sensor 150 that has been continuously pressurized by the second door 20 is released.

When the door opening/closing sensor 150 senses the opening moment of the second door 20, the camera 100 may take a picture.

Then, as the receptacle 30 is moved, the magnet 90 may have an effect on the Hall sensors 92 and 94, thereby allowing the Hall sensors 92 and 94 to determine a position of the receptacle 30. In this way, the camera 100 may take a picture at a position where the magnet 90 has an effect on the Hall sensors 92 and 94.

Figure 9:
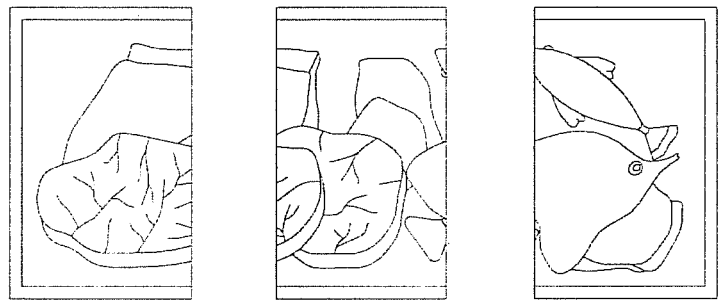
FIG. 9 is illustrates a plurality of pictures taken by the processes shown in FIGS. 7 and 8.

That is, in this exemplary embodiment, the camera 100 may take a total of three pictures from the moment the second door 20 is moved from a closed state until it reaches a completely open position. The pictures acquired may provide exemplary images as shown in FIG. 9.

In certain embodiments, the light source 86 may emit light when the camera 100 takes a picture. In certain embodiments, the light source 86 may not emit light if sufficient luminance to allow the camera 100 to take a picture is available.

Figure 7:
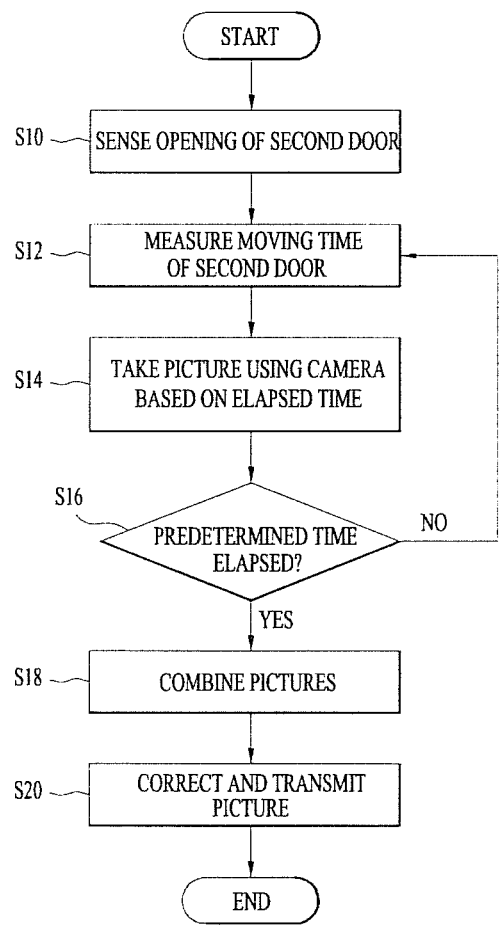
FIG. 7 is a flowchart of a picture taking process based on an elapsed time as a second door is opened, according to an embodiment as broadly described herein.

FIG. 7 is a flowchart of a picture taking process based on an elapsed time as the second door is open, according to one embodiment as broadly described herein.

The door opening/closing sensor 150 may sense opening of the second door 20 (S10).

The timer 140 may be activated to measure an elapsed time, starting at a moment when the second door 20 beings to open (S12).

The camera 100 may take one or more pictures of the receptacle 30 based on the elapsed time measured by the timer 140 (S14).

A predetermined time to open the second door 20 may be calculated by an average speed at which a general user moves the second door 20. That is, the camera 100 may take a picture of the receptacle 30 whenever tri-section positions pass the camera 100 as the general user moves the second door 20. For example, the time may correspond to two trisection points passed within the time taken to completely withdraw the second door 20.

Then, it is determined whether or not the predetermined time to open the second door 20 has elapsed (S16). When the predetermined time has elapsed, the second door 20 may be withdrawn to a position where it is unnecessary to take another picture.

At this point, as the camera 100 has taken a plurality of pictures, the controller 80 may combine the plurality of pictures together (S18).

Then, the controller 80 may correct the plurality of pictures into a single image, and transmit the single image to a separate device (S20).

Figure 10:
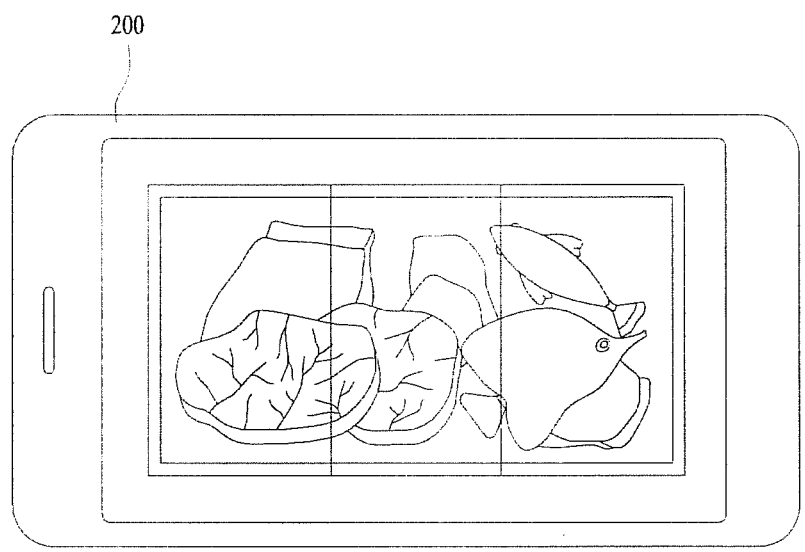
FIG. 10 illustrates the pictures of FIG. 9 corrected and transmitted to a terminal.

The plurality of pictures taken by the camera 100 may provide images as shown in, for example, FIG. 9, and finally may be transmitted to the terminal 200 in the form of an image as shown in, for example, FIG. 10. The user may intuitively and easily recognize information related to food stored in the receptacle 30 by the single image shown in FIG. 10.

Figure 8:
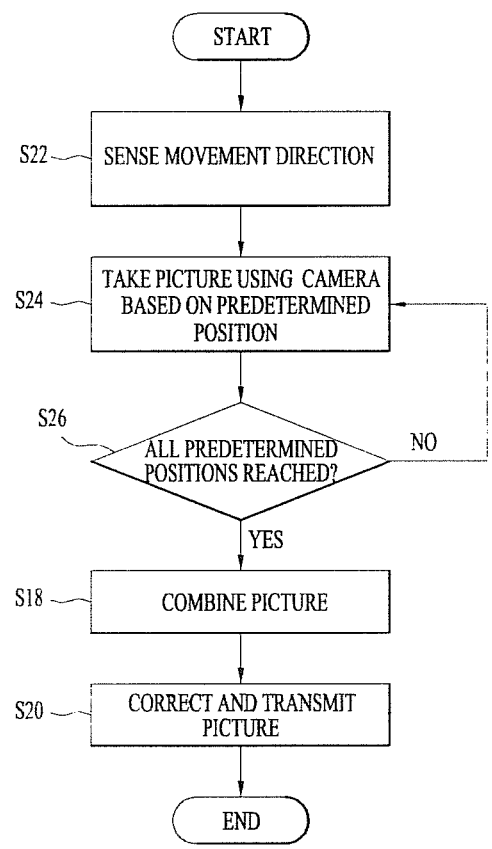
FIG. 8 is a flowchart of a picture taking process based on a movement direction of a second door, according to an embodiment as broadly described herein.

FIG. 8 is a flowchart of a picture taking process based on a movement direction of the second door, according to one embodiment as broadly described herein.

First, the receptacle movement direction sensor 160 senses a movement direction of the second door 20 or the receptacle 30 (S22), as the receptacle 30 is fixed to the second door 20 and the receptacle 30 and the second door 20 move together. That is, the receptacle movement direction sensor 160 may sense whether the second door 20 or the receptacle 30 is introduced into or withdrawn from the second storage compartment 18.

When the receptacle movement direction sensor 160 senses the introduction or withdrawal of the second door 20, the camera 100 may take one or more pictures of the receptacle 30.

If it is determined by the receptacle position sensor 130 that the receptacle 30 has received a predetermined position, the camera 100 may take a picture at the corresponding position (S24). In certain embodiments, there may be a plurality of predetermined positions.

If it is determined that the receptacle 30 has reached all of the plurality of predetermined positions (S26), a corresponding plurality of pictures has been taken by the camera 100, and therefore the controller 80 may combine the plurality of pictures with one another (S18).

On the other hand, if it is determined that the receptacle 30 has not reached all of the predetermined positions (S26), the camera 100 may remain ready for taking a picture.

Once all of the predetermined positions has received, the controller 80 may correct the plurality of pictures into a single picture, and transmit the single picture to a device separate from the camera 100 (S20).

The plurality of pictures taken by the camera 100 may provide images as shown in, for example, FIG. 9, and finally may be transmitted to the terminal 200 in the form of an image as shown in, for example, FIG. 10.

In this case, the camera 100 may take pictures as the receptacle 30 is moved to be introduced into the second storage compartment 18, and the controller 80 combines the pictures to form a consolidated image.

The user may move the second door 20 forward when taking food out of the receptacle 30 or storing new food in the receptacle 30, and thereafter move the second door 20 rearward to close the second storage compartment 18. That is, the user may introduce the receptacle 30 into the second storage compartment 18 after accessing the receptacle 30 and completing desired work, and the latest information related to the interior of the receptacle 30 may be acquired upon occurrence of the above-described situation.

The camera 100 may take a plurality of pictures as shown in, for example, FIG. 9. In this case, the pictures may provide an image as if the user looks down into the receptacle 30 because the camera 100 is oriented to take a picture downward.

In certain embodiments, the camera 100 may take four or more pictures, or may take two or less pictures, rather than taking three pictures. That is, the number of pictures taken by the camera 100 may be adjusted by adjusting the number of pictures taken by the camera 100 and/or a picture taking range of the camera 100.

For example, if a picture taking range of the camera 100 at a single picture taking time is increased, it may be possible to reduce the number of pictures taken by the camera 100. On the other hand, if a picture taking range of the camera 100 at a single picture taking time is reduced, the number of pictures taken by the camera 100 may be increased, so as to acquire an image of the entire receptacle 30.

The camera 100 may be fixed to the main body 2, and the second door 20 or the receptacle 30 may be moved. Accordingly, even if the camera 100 is stationary, a picture taking region of the camera 100 may vary as the receptacle 30 is withdrawn by different degrees. The camera 100 may take a picture as the withdrawal degree of the receptacle 30 varies.

FIG. 10 shows a picture displayed on the terminal 200, however, the same information may be transmitted to the display 120.

In this case, the image contains content regarding the interior of the receptacle 30, and in particular, the contents of the interior of the receptacle 30. That is, the image may show the entire receptacle 30.

In addition, the image may provide a screen as if the user looks down into the interior of the receptacle 30 in a state in which the receptacle 30 is sufficiently exposed to the user, thereby assisting the user in intuitively and easily recognizing the image.

In certain embodiments, the image may be a single panoramic picture. That is, the single picture may prevent an unnecessary increase in photo capacity when the picture is transmitted to the user.

The user may recognize information related to the state, type, and amount of food stored in the receptacle 30 by simply viewing the image. Accordingly, it is unnecessary to frequently open the door 20 of the refrigerator, and energy consumption may be reduced by preventing leakage of cold air from the second storage compartment 18 due to opening of the door 20.

In addition, when the user is away from home, the user may determine food to be purchased and food not to be purchased using the image. Accordingly, waste of food due to repeated purchase and inconvenience caused when not purchasing necessary food may be prevented.

Figure 11:
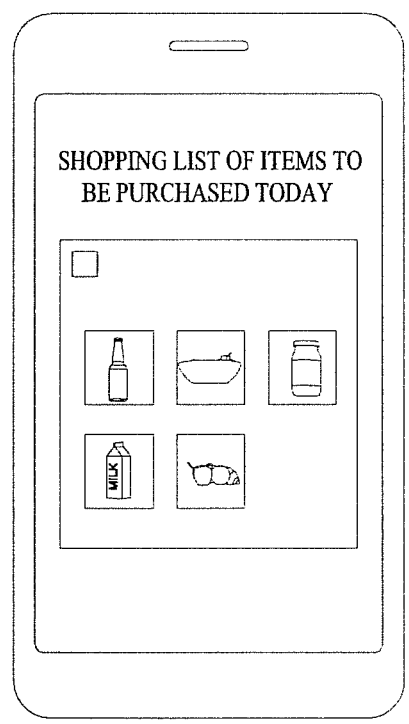
FIG. 11 illustrates an exemplary implementation on the terminal of FIG. 10.

FIG. 11 provides an implementation example in which image shown in FIG. 10 may be processed to provide the user with a shopping list of items to purchase.

The shopping list of items may be produced and managed by the user as information related to food is directly extracted from the image, or as the user extracts information related to food and additionally inputs and manages the information.

Figure 12:
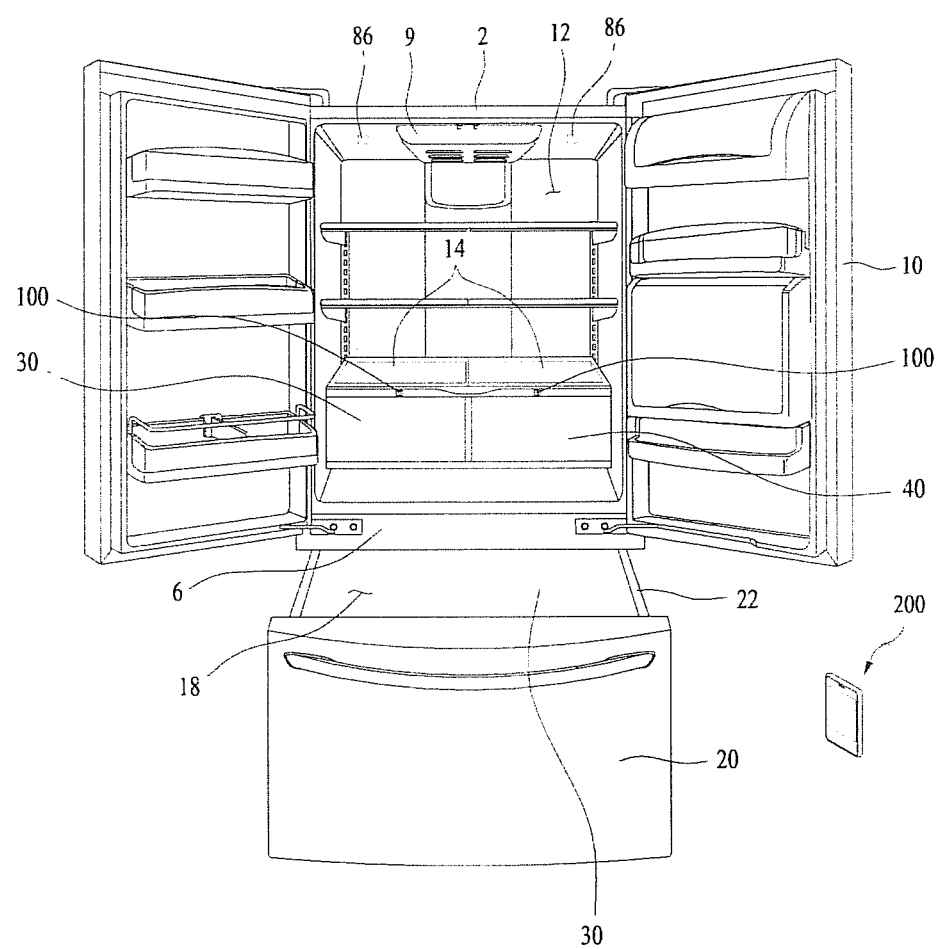
FIG. 12 is a front view of a refrigerator according to another embodiment as broadly described herein.

FIG. 12 is a front perspective view of a refrigerator according to another embodiment as broadly described herein.

In addition to the refrigerator according to the earlier described embodiment features as broadly described herein may also be applied to a side by side type refrigerator in which a refrigerating compartment and a freezing compartment are located at left and right sides, or a general refrigerator in which each of a refrigerating compartment door and a freezing compartment door opens or closes a storage compartment via pivotal rotation thereof.

Accordingly, in the following description of another embodiment of the, the same or similar parts as those previously described will not be further described, simply for convenience of description. With regard to these parts a description of which is omitted, the same or similar content may be applied to another embodiment.

The drawer 40 provided below the shelf 14 may define an internal receptacle 30, (shown in detail in FIG. 14) in which food is stored. In this case, the drawer 40 may be introduced into or withdrawn from the space defined below the shelf 14. The camera 100 may be installed at the shelf 14 to take a picture of the space below the shelf 14, i.e. the receptacle 30.

When the drawer 40 is sufficiently introduced into the space below the shelf 14, the space below the shelf 14, i.e. the receptacle 30 may be sealed. The receptacle 30 may serve to store items, such as vegetables, etc.

In certain embodiments, two drawers 40 may be arranged in a width direction to divide a width of the main body 2 into two parts. If the two drawers 40 are provided, two or more cameras 100 may also be provided. That is, the number of cameras 100 may be greater than or equal to the number of the drawers 40. As such, each camera 100 may take a picture of the receptacle 30 of the drawer 40 closet thereto.

If a plurality of drawers 40 is provided, the drawers 40 may be independently introduced or withdrawn. Likewise, if camera 100 is provided to correspond to each drawer 40, in a one to one ratio, each camera 100 takes a picture of items stored in the receptacle 30 provided in the corresponding drawer 40.

The camera 100 may be centrally located in a width direction of the single drawer 40. That is, a single camera may be provided to take a picture of a single drawer. In addition, the camera 100 may be placed on the shelf 14 so as not to be moved differently from the drawer 40, thereby serving to take a picture downward.

The light source 86 may be mounted in the first storage compartment 12 to emit light into the first storage compartment 12 to allow the user to recognize the interior of the first storage compartment 12 when the first door 10 is open.

A portion of the shelf 14 and a portion of the drawer 40 may be formed of a transparent material. This may allow light emitted by the light source 86 to be easily transmitted to the receptacle 30 through the shelf 14 and the drawer 40. With this feature, the camera 100 may acquire sufficient luminance when taking a picture of the contents of the receptacle 30.

Figure 13:
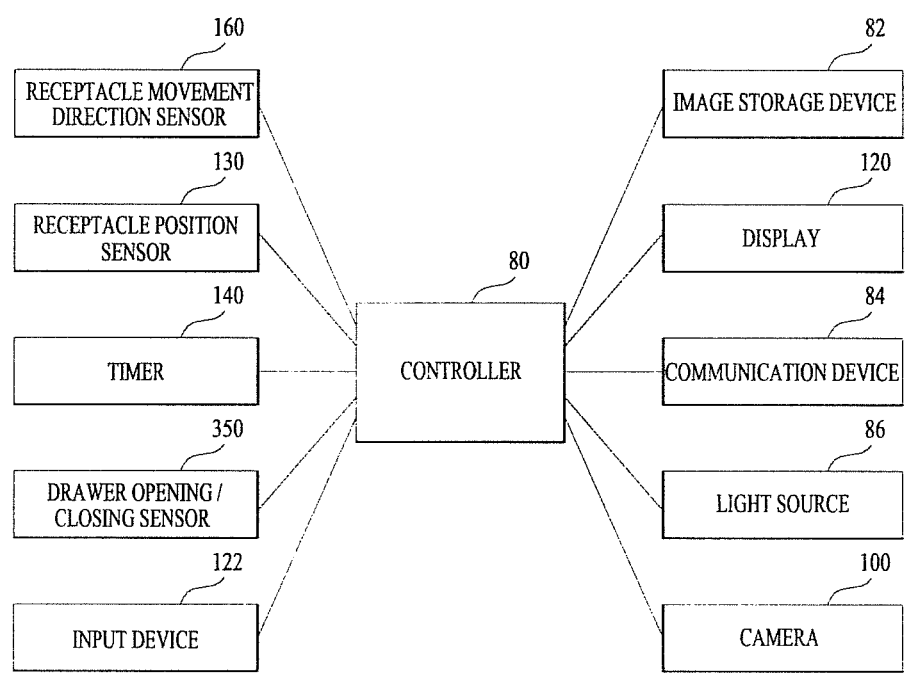
FIG. 13 is a block diagram of a controller according to another embodiment as broadly described herein.

FIG. 13 is a block diagram according to another embodiment as broadly described herein.

According to this embodiment, the controller 80 may combine a plurality of pictures taken by the camera 100 with one another and correct the pictures into an image showing the receptacle 30. In this case, the controller 80 may correct a plurality of pictures taken by the camera 100 into a single image. Of course, the controller 80 may transmit a single picture taken by the camera 100 to an external device, i.e. the terminal 200. In particular, the controller 80 may combine an image captured by the camera 100 in a closed state of the drawer 40 and an image captured by the camera 100 in an open state of the drawer 40 with each other, and may correct the images into an image showing the receptacle 30.

The closed state of the drawer 40 may refer to a state in which the receptacle 30 is completely sealed, or a state in which the receptacle 30 is sealed to a designated level or more. The open state of the drawer 40 may include a state in which the drawer 40 is open and is stationary. Alternatively, the open state of the drawer 40 may include a state in which the drawer 40 is open and is moving. In addition, the open state of the drawer 40 may include a state in which the drawer 40 is open and is stationary, and a state in which the drawer 40 is open and is moving. The definition of the open state of the drawer 40 may be construed in the same definition of the open state of the drawer 20 according to the first embodiment, and thus further description of this will be omitted herein.

The controller 80 may combine two pictures taken by the camera 100 to correct the pictures into a single image, or may combine three or more pictures to correct the pictures into a single image.

The controller 80 may provide the user with an intuitively and easily recognizable image by combining the pictures taken by the camera 100. In this case, the controller 80 may implement combination of a plurality of pictures and individual correction of the pictures. In certain embodiments, combination of the plurality of pictures may be implemented by an external control device rather than the controller 80 of the refrigerator.

According to another embodiment, the receptacle position sensor 130 may sense a position of the receptacle 30. The receptacle position sensor 130 may check whether the receptacle 30 has been moved as well as sense a moved position of the receptacle 30. In addition, when the receptacle position sensor 130 senses that the receptacle 30 reaches a predetermined position, the receptacle position sensor 130 may transmit a related signal to the controller 80 to allow the controller 80 to instruct the camera 100 to take a picture. In this case, a plurality of positions may be predetermined with regard to the receptacle 30 such that the camera 100 takes a plurality of pictures of the receptacle 30 at the plurality of predetermined positions.

The receptacle position sensor 130 may include a Hall sensor using Hall effects. The Hall sensor may find the magnitude and direction of a magnetic field using Hall effects in which a potential difference is produced across a conductor carrying an electric current when a magnetic field is applied in a direction perpendicular to that of the current flow.

According to another embodiment, the timer 140 may be provided to measure passage of time. In this case, the timer 140 may measure, in particular, a movement duration of the receptacle 30, although the timer 140 may also measure general passage of time. When a predetermined time measured by the timer 140 has passed, the timer 140 may transmit a related signal to the controller 80 to allow the controller 80 to instruct the camera 100 to take a picture.

According to another embodiment, a drawer opening/closing sensor 350 may be provided to sense opening/closing of the drawer 40. The drawer opening/closing sensor 350 may sense whether or not the drawer 40 is released from contact with the shelf 14, for example. The drawer opening/closing sensor 350 may transmit information related to whether the drawer 40 is open or closed to the controller 80. The drawer opening/closing sensor 350 may be provided at each drawer 40, as a plurality of drawers 40 may implement individual and independent movement.

According to another embodiment, the receptacle movement direction sensor 160 may sense a movement direction of the receptacle 30. In this case, the receptacle movement direction sensor 160 may include a plurality of receptacle position sensor 130 to sense a movement direction of the receptacle 30 using sensed results from the receptacle position sensor 130. The receptacle movement direction sensor 160 may sense a movement direction of the receptacle 30 and transmit a related signal to the controller 80. That is, the controller 80 may detect a movement direction of the receptacle 30 under assistance of the receptacle movement direction sensor 160. More specifically, since the receptacle 30 may be withdrawn from or introduced into the space below the shelf 14, the receptacle movement direction sensor 160 may sense whether the receptacle 30 is moving forward or rearward.

According to another embodiment, the image storage device 82 may be provided to store an image corrected by the controller 80. The image storage device 82 may store all images corrected by the controller 80 including the most recently corrected image as well as previously corrected images. The image stored in the image storage device 82 may be transmitted to the terminal 200 or the display device 120, and the user may recognize information related to the interior of the refrigerator via the terminal 200 or the display 120.

According to another embodiment, the input device 122 may allow the user to input an instruction to the refrigerator. The input device 122 may be integrated with the display 120 to allow the user to input an instruction via the display 120.

According to another embodiment, the communication device 84 may transmit an image corrected by the controller 80 to an external device. The communication device 84 may transmit a corrected image to the terminal communication device 210 as shown in, for example, FIG. 2. In particular, the communication device 84 may transmit an image stored in the image storage device 82 or an image corrected by the controller 80 to an external device. In certain embodiments, the controller 80 may control the light source 86 to allow the light source 86 to emit light to the receptacle 30 when the camera 100 takes a picture.

Figure 14A:
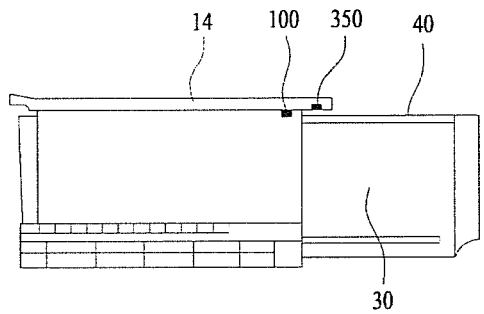
FIGS. 14A-14C are side sectional views of operation of the refrigerator shown in FIG. 12, according to another embodiment as broadly described herein.
Figure 14B:
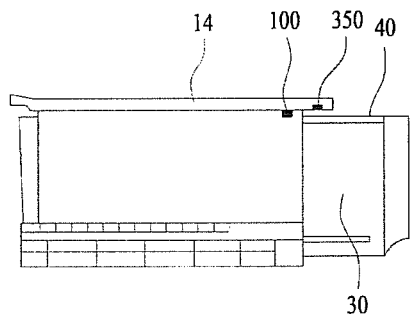
Figure 14C:
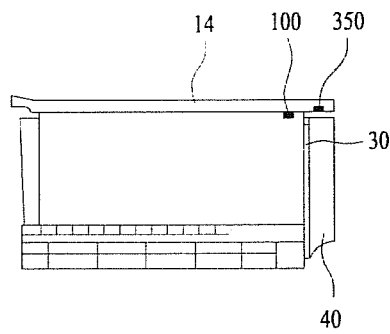
Figure 15:
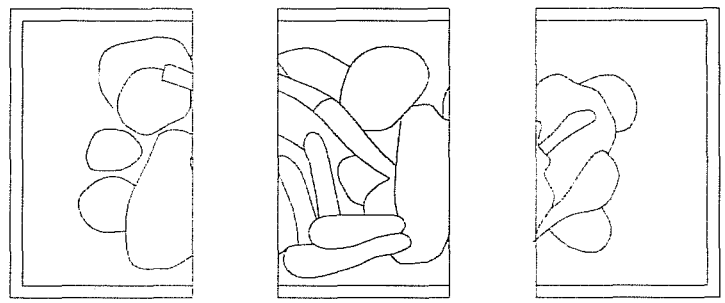
FIG. 15 illustrates a plurality of pictures.

FIGS. 14A-14C illustrate operation according to another embodiment, and FIG. 15 illustrates an exemplary plurality of pictures.

The camera 100 may be installed at a front region of the receptacle 30. The front region of the receptacle 30 may refer to, for example, a portion that the user will grip to open the drawer 40. In particular, the camera 100 may be installed to take a picture of the receptacle 30 within a maximum withdrawal region of the receptacle 30. That is, even in a section where the receptacle 30 is maximally withdrawn, a picture taken by the camera 100 may show the interior of the receptacle 30.

The above-described method of taking a picture using the camera 100 with respect to previous embodiments may be equally applied to this embodiment. That is, the camera 100 may take a picture according to sensed results, i.e. a sensed point in time or a sensed position from the receptacle movement direction sensor 160, the receptacle position sensor 130, and the timer 140. Thus, further detailed description will be omitted.

In particular, the receptacle position sensor 130 and the receptacle movement direction sensor 160 according to another embodiment may be installed and configured in the same manner as those of the previous embodiment. Since detailed configurations of receptacle position sensor 130 and the receptacle movement direction sensor 160 may be sufficiently understood from FIG. 4, the receptacle position sensor 130 and the receptacle movement direction sensor 160 are not illustrated in detail in FIGS. 14A-14C.

The drawer opening/closing sensor 350 may be installed at a position where the drawer 40 and the shelf 14 meet each other. That is, the drawer opening/closing sensor 350 may be installed at the shelf 14 such that the receptacle 30 is recognized as being closed/sealed when the drawer 40 applies pressure to the drawer opening/closing sensor 350. On the other hand, if the drawer 40 applies no pressure to the drawer opening/closing sensor 350, it may be recognized that the drawer 40 is withdrawn and the receptacle 30 is not sealed.

In certain embodiments, the drawer opening/closing sensor 350 may be modified into various other shapes so long as it may sense opening/closing of the drawer 40.

According to another embodiment, the camera 100 may take a picture while the drawer 40 is being moved in a closing direction thereof, as shown in, for example, FIGS. 14-14C.

The user may access the receptacle 30 to remove items from the receptacle 30 or to introduce new items into the receptacle 30 after opening the drawer 40. Then, after completion of access to the receptacle 30, the user may introduce the drawer 40 back into the space below the shelf 14. That is, the latest information related to the receptacle 30 may be acquired from a picture taken while the drawer 40 is being introduced back into the space by the user.

Pictures taken at positions as shown in FIGS. 14A-14C may be a plurality of split pictures as shown in, for example, FIG. 15. In this case, the controller 80 may combine a plurality of pictures to correct the pictures into a single picture. The picture corrected by the controller 80 may be a panoramic picture.

The camera 100 may be fixed to a surface of the shelf 14 that faces the receptacle 30, and the receptacle 30 may be moved. As such, the camera 100 may take pictures at various positions of the receptacle 30, i.e. as the withdrawal degree of the receptacle 30 varies.

Utilization with regard to another embodiment may be equal to the previous embodiment, and thus further detailed description will be omitted.

Figure 16:
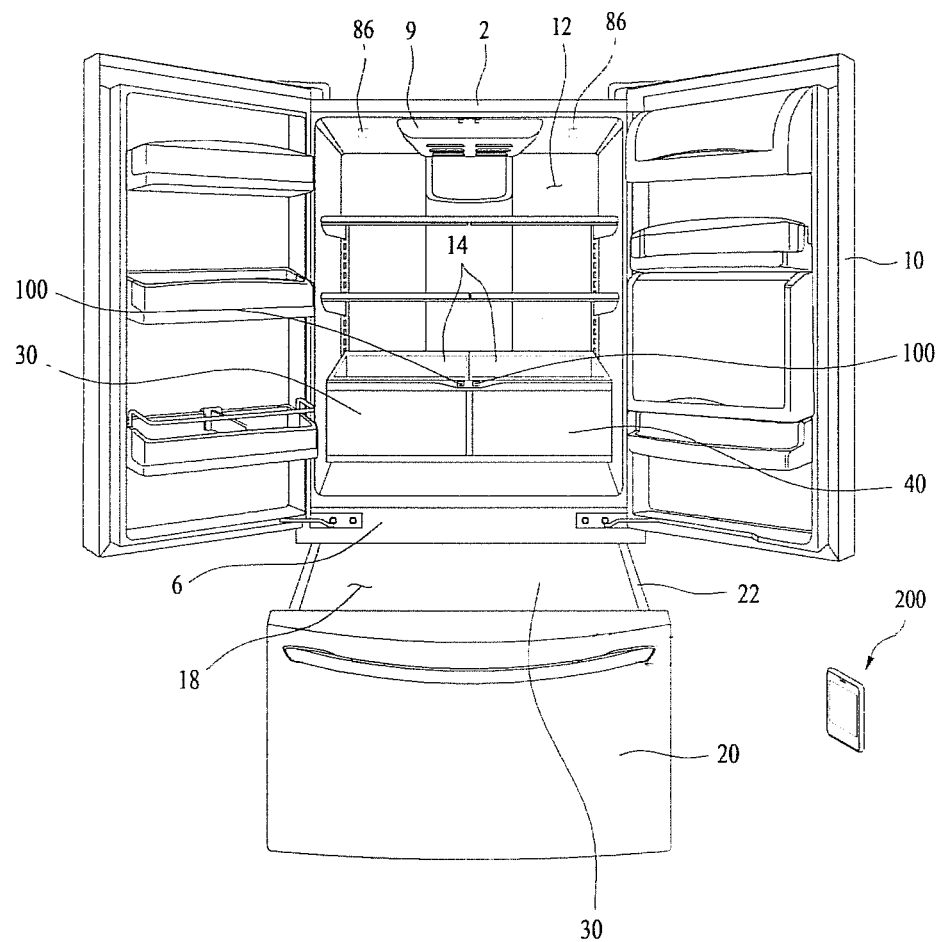
FIG. 16 is a front view of a refrigerator according to another embodiment as broadly described herein.

FIG. 16 is a front perspective view of a refrigerator according to another embodiment as broadly described herein.

As compared to the embodiment shown in FIG. 12, this embodiment is different in terms of an installation position of the camera 100, and in that the camera 100 takes a picture of the receptacle 30 in a stationary state of the drawer 40. Accordingly, the following description will focus on differences, and further detailed description of the same parts will be omitted.

In this embodiment, the camera 100 is installed at a position deviated to one side in a width direction of the drawer 40. That is, the camera 100 is located close to one side of the drawer 40 to take a picture within a range from one side to the other side of the drawer 40. The light source 86 may be installed at the exterior of the receptacle 30 rather than being installed within the receptacle 30. For example, the light source 86 may implement the same function as that of Light Emitting Diodes (LEDs) that emit light to the interior of the first storage compartment 12 in a general refrigerator. The shelf 14 and the drawer 40 may be formed of a transparent material. In particular, the shelf 14 disposed above the drawer 40 may be formed of a transparent material to allow light emitted from the light source 86 to penetrate the shelf 14 and provide the interior of the receptacle 30 with sufficient luminance.

Figure 17:
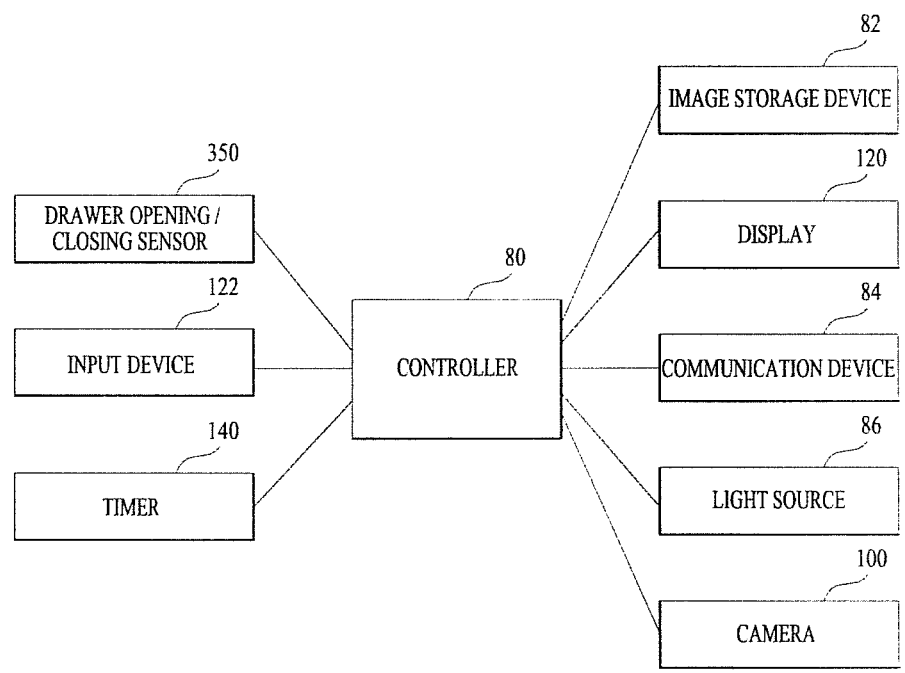
FIG. 17 is a block diagram of a controller according to another embodiment as broadly described herein.

FIG. 17 is a block diagram according to another embodiment. In this embodiment, differently from the embodiment shown in FIGS. 12 and 13, the receptacle movement direction sensor, the receptacle position sensor, and the timer are not utilized. That is, the camera 100 may take a picture in response to a sensed signal from the drawer opening/closing sensor 350 and a signal generated from the input device 122. The camera 100 may acquire information related to the receptacle 30 by taking a single picture. Accordingly, the controller 80 may not need to combine and correct a plurality of pictures taken by the camera 100. That is, the controller 80 may transmit a picture taken by the camera 100 to the image storage device 30, or may transmit the picture to an external device via the communication device 84.

The timer 140 may measure an elapsed time from a point in time when the camera 100 takes a picture. That is, the timer 140 may transmit information, related to an elapsed time from a point in time when the camera 100 takes the last picture, to the controller 80 or the camera 100.

The camera 100 may take a picture in response to a signal generated from the input device 122. The camera 100 may take a picture in a stationary state of the drawer 40, and therefore the camera 100 may take a picture of the receptacle 30 by operating the input device 122. In addition, the camera 100 may take a picture in response to a periodic signal generated by the timer 140.

Other constituent elements shown in FIG. 17 are similar to those previously described, and thus further detailed description thereof will be omitted.

Figure 18:
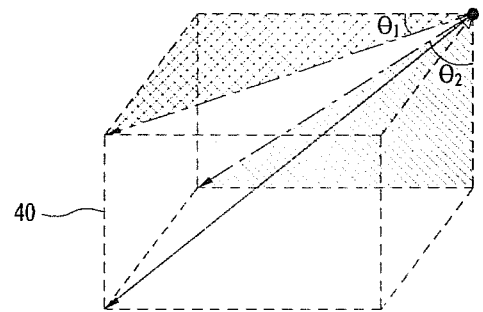
FIG. 18 illustrates a picture taking direction of a camera according to another embodiment as broadly described herein.

FIG. 18 illustrates a picture taking direction of the camera according to another embodiment. The camera 100 may provide the user with information related to the interior of the receptacle 30 via a single picture. Thus, the camera 100 may acquire information related to items stored in the receptacle 30 via single picture taking. More specifically, the camera 100 may be obliquely oriented at a prescribed angle $\theta 1$ with reference to a horizontal plane. In this case, the camera 100 may be oriented to face an opposite corner of a horizontal plane. Of course, instead of the angle $\theta 1$, the camera 100 may be tilted, with reference to the horizontal plane, by an angle appropriate to ensure that the camera 100 effectively takes a picture of items stored in the receptacle 30. Note that the angle $\theta 1$ may be zero degrees or more.

In addition, the camera 100 may be obliquely oriented at a prescribed angle $\theta 2$ with reference to a vertical plane. In this case, the camera 100 may be oriented to face an opposite corner with respect to the vertical plane. Of course, instead of the angle $\theta 2$, the camera 100 may be tilted, with respect to the vertical plane, by an angle appropriate to ensure that the camera 100 effectively takes a picture of items stored in the receptacle 30. Note that the angle $\theta 2$ may be zero degrees or more.

In this embodiment camera 100 takes a single still picture of the interior of the receptacle 30, so tilting the camera 100 may ensure acquisition of a greater quantity of information as it may otherwise be difficult to acquire information related to items stored in the receptacle 30 via single picture taking if the camera 100 is not tilted.

Figure 19A:
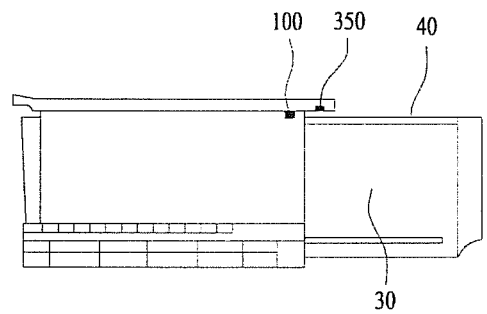
FIGS. 19A and 19B are side sectional views of operation of the refrigerator according to another embodiment.
Figure 19B:
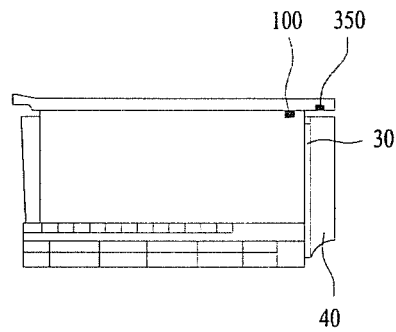

As shown in FIGS. 19A and 19B, the camera 100 may take a picture at a moment when the drawer 40 closes the receptacle 30. That is, after the user withdraws the drawer 40 and then completes access to the receptacle 30, the camera 100 takes a picture of the receptacle 30 when the drawer 40 is again introduced back into the space by the user. In this case, the light source 86 may emit light to the receptacle 30. Since the first door 10 is open while the drawer 40 is being moved by the user, the light source 86 may continuously emit light without additional manipulation.

The drawer opening/closing sensor 350 may be installed at the shelf 14 and serve to sense opening/closing of the drawer 40 according to whether or not the drawer opening/closing sensor 350 comes into contact with the drawer 40. As such, a moment when the drawer 40 begins to apply pressure to the drawer opening/closing sensor 350 may be recognized as a moment when the drawer 40 is introduced into the space below the shelf 14 to thereby seal the receptacle 30. Accordingly, the camera 100 may take a picture of the receptacle 30 at the moment sensed by the drawer opening/closing sensor 350.

That is, the camera 100 may take a picture of the receptacle 30 in a state in which the drawer 40 is introduced into the space below the shelf 14, i.e. in a state in which the space below the shelf 14 is sealed.

Figure 20:
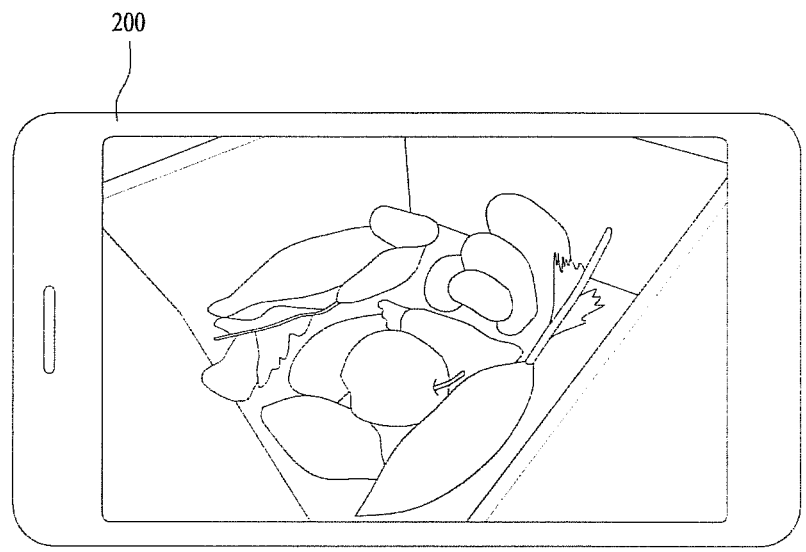
FIG. 20 illustrates a picture transmitted to a terminal according to another embodiment.

The picture taken by the camera 100 may be transmitted to the terminal 200 through the communication device 84. In this case, the picture taken by the camera 100 may provide an image as shown in, for example, FIG. 20. That is, the picture taken by the camera 100 provides an image as if the user obliquely looks down from the upper side of the receptacle 30.

Figure 21:
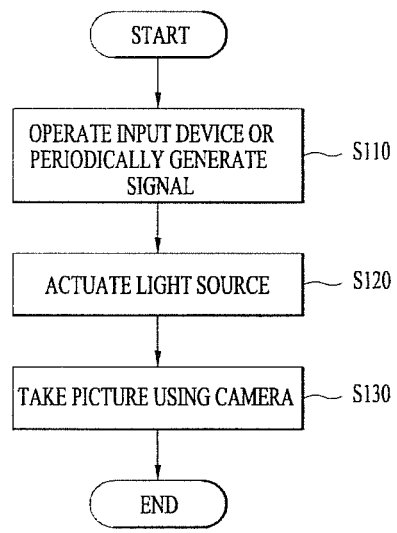
FIG. 21 is a flowchart of a picture taking process based on operation of a drawer, according to another embodiment as broadly described herein.

FIG. 21 is a flowchart of a picture taking process based on the operation of the drawer described above.

The user may operate the input device 22 or set the timer 140 to generate a signal at a prescribed interval (S110). In this case, the user may acquire information related to items stored in the refrigerator as the user operates the input device 122 or based on signals periodically generated by the timer 140.

When the user operates the input device 122 or the timer 140 generates signals, the first storage compartment 12 is sealed by the first door 10. That is, even if the user does not open the first storage compartment 12, the input device 122 or the timer 140 enables picture taking by the camera 100.

The light source 86 typically does not emit light in a closed state of the first storage compartment 12. Thus, sufficient light to allow the camera 100 to take a picture would not be emitted to the receptacle 30 and a picture taken by the camera 100 would not contain sufficient information related to the contents of the receptacle 30.

Accordingly, the light source 86 is actuated (S120). Since the shelf 14 and the drawer 40 are partially formed of a transparent material, light emitted from the light source 86 may penetrate the shelf 14 and the drawer 40 to thereby reach the receptacle 30. In this case, the camera 100 is in a stationary state, and thus may take a picture only one time (S130), as the same picture would be acquired even if the single stationary camera were to take a plurality of pictures.

Later, the controller 80 may transmit the picture taken by the camera 100 to the image storage device 82, or may transmit the picture to an external device via the communication device 84.

Embodiments may provide a storage apparatus including: a main body having a storage chamber in which an article is stored; a drawer configured to be moved forward of the main body; a camera located in a front region of the storage chamber to take a picture of the interior of the drawer in a state in which the drawer is withdrawn to the maximum extent; a control unit configured to combine an image captured by the camera in a closed state of the drawer and an image captured by the camera in an open state of the drawer with each other and configured to correct the images into an image showing the interior of the drawer; and a display unit configured to show the corrected image to a user.

In the above-described storage apparatus, the open state of the drawer may include a state in which the drawer is open and is stationary.

Alternatively, in the above-described storage apparatus, the open state of the drawer may include a state in which the drawer is open and is moving.

In this case, the storage apparatus may include the refrigerator as described above, and may refer to an apparatus that may provide a space for storage of industrial products and various other articles rather than food.

In a refrigerator as embodied and broadly described herein, a user may access and recognize information related to food stored in a refrigerator even if the user does not open a refrigerator door.

Further, even when the user is away from home, the user may access and recognize information related to food stored in the refrigerator via a portable terminal.

Furthermore, the user may view a screen similar to that which is visible the user directly opens the refrigerator, which assists the user in easily recognizing the interior state of the refrigerator.

A refrigerator is provided which may provide a user with information related to food stored in the refrigerator.

A refrigerator is provided which may allow a user to intuitively and easily recognize food stored in the refrigerator.

A refrigerator as embodied and broadly described herein may include a main body having a storage compartment in which food is stored, a door configured to be moved forward of the storage compartment to open the storage compartment, a receptacle configured to be moved along with the door and received in the storage compartment, the receptacle serving to store food therein, a camera installed to the main body to capture an image of the receptacle, a control unit configured to combine an image captured by the camera in a closed state of the door and an image captured by the camera in an open state of the door with each other and configured to correct the images into an image showing the receptacle, and a display unit configured to show the corrected image to a user.

The open state of the door may include a state in which the door is open and is stationary.

The open state of the door may include a state in which the door is open and is moving.

The camera may be located in a front region of the storage compartment.

The camera may be installed to capture an image of the receptacle within a maximum withdrawal region of the receptacle.

The corrected image may show the receptacle looked down from the upper side.

The refrigerator may further include a receptacle position sensing unit configured to sense a position of the receptacle, and the camera may take a picture when a specific portion of the receptacle passes a predetermined position.

The refrigerator may further include a receptacle movement direction sensing unit configured to sense a movement direction of the receptacle, and the camera may take a picture when the receptacle is moved to be introduced into the storage compartment.

The refrigerator may further include a door opening/closing sensing unit configured to sense opening/closing of the door.

The storage compartment may include a first storage compartment and a second storage compartment, in which food is stored, and the camera may be installed to a barrier, the barrier dividing the first storage compartment and the second storage compartment into separate spaces.

In accordance with another embodiment as broadly described herein, a refrigerator may include a main body having a storage compartment in which food is stored, a drawer configured to be introduced into or withdrawn from the storage compartment, the drawer having a receptacle in which food is stored, a camera configured to capture an image of the receptacle, a control unit configured to combine an image captured by the camera in a closed state of the drawer and an image captured by the camera in an open state of the drawer with each other and configured to correct the images into an image showing the receptacle, and a display unit configured to show the corrected image to a user.

The open state of the drawer may include a state in which the drawer is open and is stationary.

The open state of the drawer may include a state in which the drawer is open and is moving.

The camera may be located in a front region of the receptacle.

The camera may be installed to capture an image of the receptacle within a maximum withdrawal region of the receptacle.

The refrigerator may further include a drawer opening/closing sensing unit configured to sense opening/closing of the drawer, and the camera may take a picture based on an elapsed time when the drawer opening/closing sensing unit senses opening of the drawer.

The refrigerator may further include a communication unit configured to transmit the image to an external device.

The refrigerator may further include an image storage unit configured to store the last image corrected by the control unit.

The refrigerator may further include a communication unit configured to transmit the last image stored in the image storage unit to an external device.

In accordance with another embodiment as broadly described herein, a storage apparatus may include a main body having a storage chamber in which an article is stored, a drawer configured to be moved forward of the main body, a camera located in a front region of the storage chamber to capture an image of the interior of the drawer in a state in which the drawer is withdrawn to the maximum extent, a control unit configured to combine an image captured by the camera in a closed state of the drawer and an image captured by the camera in an open state of the drawer with each other and configured to correct the images into an image showing the interior of the drawer, and a display unit configured to show the corrected image to a user.

The open state of the drawer may include a state in which the drawer is open and is stationary.

The open state of the drawer may include a state in which the drawer is open and is moving.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
a main body having a storage compartment having a first storage compartment and a second storage compartment, the first storage compartment positioned below the second storage compartment;
a barrier dividing the first storage compartment and the second storage compartment;
a door coupled to the main body and configured to open the first storage compartment and to close the first storage compartment;
a receptacle received in the first storage compartment and coupled to the door so as to move together with the door;
a receptacle position sensor provided within the first storage compartment and configured to sense a predetermined movement distance of the receptacle;
a camera provided within the first storage compartment to capture images of an interior of the receptacle according to the receptacle position sensor;
a door sensor mounted on the main body and configured to sense opening or closing of the door;
a controller configured to combine images captured by the camera, and to correct the images into a single corrected image of the interior of the receptacle when the door is closed; and
a display configured to externally display the corrected image,
wherein the camera is installed on a lower surface of the barrier.

2. The refrigerator according to claim 1, wherein an open state of the door comprises a state in which the door is open with respect to the first storage compartment and is stationary.

3. The refrigerator according to claim 1, wherein an open state of the door comprises a state in which the door is open with respect to the first storage compartment and is moving.

4. The refrigerator according to claim 1, wherein the camera is located at a position corresponding to a front region of the first storage compartment.

5. The refrigerator according to claim 4, wherein the camera is oriented so as to capture an image of the interior of the receptacle within a maximum withdrawal region of the receptacle.

6. The refrigerator according to claim 1, wherein the corrected image provides a view of the interior of the receptacle looking down into the receptacle from above the receptacle.

7. The refrigerator according to claim 1, wherein the receptacle position sensor is configured to sense a position of the receptacle relative to the main body, wherein the camera is configured to take a picture of the interior of the receptacle when a specific portion of the receptacle passes a predetermined position in response to a signal generated by the receptacle position sensor.

8. The refrigerator according to claim 1, further including a receptacle movement direction sensor configured to sense a movement direction of the receptacle, wherein the camera is configured to take a picture of the interior of the receptacle when the receptacle is moved toward the storage compartment in response to a signal generated by the receptacle movement direction sensor.

9. A refrigerator, comprising:
a main body having a storage compartment;
a door configured to open and close the storage compartment;
a door opening/closing sensor installed on the main body;
a shelf provided in an inside of the storage compartment;
a drawer provided below the shelf, the drawer having a receptacle configured to receive items for storage;
a camera configured to capture images of an interior of the receptacle and installed on a lower surface of the shelf;
a controller configured to combine images captured by the camera, and to correct the images into a single corrected image of the interior of the receptacle when the door is closed; and
a display configured to externally display the corrected image,
wherein a view of the camera is focused on a corner of the receptacle.

10. The refrigerator according to claim 9, wherein an open state of the drawer comprises a state in which the drawer is open with respect to the main body and is stationary.

11. The refrigerator according to claim 9, wherein an open state of the drawer comprises a state in which the drawer is open with respect to the main body and is moving.

12. The refrigerator according to claim 9, wherein the camera is located at a position corresponding to a front region of the receptacle.

13. The refrigerator according to claim 12, wherein the camera is oriented to capture an image of the interior of the receptacle within a maximum withdrawal region of the receptacle.

14. The refrigerator according to claim 9, further including an image storage device configured to store a last corrected image generated by the controller.

15. The refrigerator according to claim 14, further including a communication device configured to transmit the last corrected image stored in the image storage device to an external device.

16. A storage apparatus, comprising:
a main body having a storage chamber;
a drawer slidably coupled to the main body;
a camera provided at a front region of the storage chamber to capture an image of an interior of the drawer in a fully open position of the drawer in which the drawer is withdrawn from the storage chamber to a maximum extent;
a controller configured to combine a first image captured by the camera in a closed state of the drawer and a second image captured by the camera in an open state of the drawer, and to combine the first and second images into a corrected image of the interior of the drawer; and
a display configured to externally display the corrected image,
wherein the camera is arranged to an inside of the storage chamber and is arranged to a front terminal of a ceiling of the drawer when the drawer is introduced, and
wherein the open state of the drawer includes states in which the drawer is open and stationary and in which the drawer is open and moving.

* * * * *